US006415705B1

(12) United States Patent
Kato et al.

(10) Patent No.: US 6,415,705 B1
(45) Date of Patent: Jul. 9, 2002

(54) SWASH PLATE TYPE COMPRESSOR PISTON WHOSE END SECTION IS FORMED OF A MATERIAL DIFFERENT FROM THAT OF SWASH-PLATE ENGAGING PORTION

(75) Inventors: Takayuki Kato; Masato Takamatsu, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/669,534

(22) Filed: Sep. 26, 2000

(30) Foreign Application Priority Data

Sep. 29, 1999 (JP) .......................................... 11-275706

(51) Int. Cl.[7] ............................... F01B 3/00; F16J 9/00

(52) U.S. Cl. ............................................. 92/71; 92/248

(58) Field of Search ........................... 92/71, 248, 255, 92/256, 176

(56) References Cited

U.S. PATENT DOCUMENTS

| | | | |
|---|---|---|---|
| 1,837,724 A | 12/1931 | Michell et al. | |
| 5,765,464 A * | 6/1998 | Morita | 92/71 |
| 5,943,941 A * | 8/1999 | Kato et al. | 92/12.2 |

FOREIGN PATENT DOCUMENTS

| | | |
|---|---|---|
| JP | A-5-149246 | 6/1993 |
| JP | A-10-159725 | 6/1998 |
| JP | A-10-205440 | 8/1998 |

* cited by examiner

*Primary Examiner*—Edward K. Look
*Assistant Examiner*—Michael Leslie
(74) *Attorney, Agent, or Firm*—Woodcock Washburn LLP

(57) ABSTRACT

A piston for a swash plate type compressor having a swash plate, including an engaging portion which engages the swash plate through a pair of shoes such that the shoes are held in contact with opposite surfaces of the swash plate at a radially outer portion of said swash plate, and a hollow cylindrical head portion having an end section which is located on the side remote from the engaging portion, wherein the engaging portion is formed of a material which is different from that of the end section of the hollow cylindrical head portion.

9 Claims, 5 Drawing Sheets

SWASH PLATE TYPE COMPRESSOR PISTON WHOSE END SECTION IS FORMED OF A MATERIAL DIFFERENT FROM THAT OF SWASH-PLATE ENGAGING PORTION

This application is based on Japanese Patent Application No. 11-275706 filed Sep. 29, 1999, the contents of which are incorporated hereinto by reference.

BACKGROUND OF THE INVENTION

1. Field of the Invention

The present invention relates in general to a piston for a swash plate type compressor, and more particularly to such a piston whose head portion slidably fitted in an appropriate cylinder bore is hollow and cylindrical.

2. Discussion of the Related Art

Since such a piston used for a compressor is reciprocated within a cylinder bore, it is desirable to reduce the weight of the piston. In particular, the reduction of the weight of the piston is desirable when the piston is used for a swash plate type compressor, especially where the swash plate type compressor is of a variable capacity type. As the swash plate type compressor adapted to compress a refrigerant gas for an air conditioning system of an automotive vehicle, there has been recently used the variable capacity type swash plate compressor whose discharge capacity is adjustable by controlling an angle of inclination of the swash plate with respect to its rotation axis. When the piston is used for this type of compressor, it is particularly required to reduce its weight. The swash plate type compressor for the automotive vehicle is generally required to be rotated at a high speed for satisfying a need for reduction of its size. In view of this, it is required to reduce the weight of the piston. Where the variable capacity type swash plate compressor is adapted to adjust the inclination angle of the swash plate based on a difference between a pressure in a pressurizing chamber and a pressure in a crank chamber, the reduction of the weight of the piston is essential for achieving a stable adjustment of the inclination angle of the swash plate and reduction of the operating noise of the compressor.

JP-A-10-159725 discloses a swash plate type compressor piston having a hollow cylindrical head portion. In the piston disclosed in this publication, a hollow cylindrical member is closed at its open end by a closure member, so at to provide the hollow cylindrical head portion. The piston thus produced has a reduced weight. The hollow cylindrical member and the closure member of this piston are both formed of an aluminum material.

SUMMARY OF THE INVENTION

It is an object of the present invention to provide a swash plate type compressor piston having an improved structure for a further reduction of its weight.

The object indicated above may be achieved according to any one of the following forms or modes of the present invention, each of which is numbered like the appended claims and depend from the other form or forms, where appropriate, to indicate and clarify possible combinations of technical features of the present invention, for easier understanding of the invention. It is to be understood that the present invention is not limited to the technical features and their combinations described below. It is also to be understood that any technical feature described below in combination with other technical features may be a subject matter of the present invention, independently of those other technical features.

(1) A piston for a swash plate type compressor including a hollow cylindrical head portion and an engaging portion which engages a swash plate through a pair of shoes such that the shoes are held in contact with opposite surfaces of the swash plate at a radially outer portion of the swash plate, wherein the engaging portion is formed of a material which is different from that of an end section of the hollow cylindrical head portion, which end section is located on the side remote from the engaging portion.

Since the shoes are slidably received in part-spherical recesses formed in the engaging portion, the engaging portion is required to exhibit a sufficiently high degree of wear resistance, whereas the end section of the hollow cylindrical head portion, which end section is opposite to the engaging portion and partially defines a pressurizing chamber of the compressor, is required to exhibit a sufficiently high degree of strength rather than a high degree of wear-resistance. In other words, the engaging portion is required to be formed of a relatively expensive material to achieve the required wear resistance, while the end section of the head portion can be formed of a relatively inexpensive material. By using different materials for the engaging portion and the end section of the head portion, the piston can be produced at a reduced cost. In general, the outer circumferential surface of the head portion is coated with a wear-resistant synthetic resin film. In this case, the cylindrical wall of the head portion need not be formed of an expensive wear-resistant material, resulting in a further reduced cost of manufacture of the piston. An aluminum alloy containing not smaller than 5 wt. % of silicon is known as a wear-resistant material. This aluminum alloy is more difficult to be forged than an aluminum alloy whose silicon content is smaller than 5 wt. %. In view of this, if only a portion of the piston which constitutes the engaging portion which is required to have a high degree of wear resistance is formed of the wear-resistant aluminum alloy whose silicon content is relatively large, the other portion of the piston can be easily formed by forging, using the aluminum alloy whose silicon content is relatively small. Accordingly, the cost of manufacture of the piston is reduced.

(2) A piston for a swash plate type compressor having a swash plate, including a hollow cylindrical head portion and an engaging portion which engages the swash plate through a pair of shoes such that the shoes are held in contact with opposite surfaces of the swash plate at a radially outer portion of the swash plate, wherein the hollow cylindrical head portion includes a hollow cylindrical body portion having an open end on the side remote from the engaging portion and a closed end on the side of the engaging portion, the engaging portion and the hollow cylindrical body portion being formed, integrally with each other, of an aluminum alloy which contains not smaller than 5 wt. % of silicon, the hollow cylindrical head portion having a closure member which closes the open end of the hollow cylindrical body portion and which is formed of a material different from that of the engaging portion and the hollow cylindrical body portion.

The present arrangement permits easy manufacture of the piston having a lightweight, hollow head portion. The aluminum alloy containing not smaller than 5 wt. % of silicon exhibits an excellent wear resistance, so that the piston exhibits a required durability at its engaging portion. In other words, the engaging portion of the piston has excellent durability at part-spherical inner surfaces of recesses formed therein for slidably receiving the pair of shoes.

(3) A piston according to the above mode (2), the closure member is formed of a synthetic resin.

The closure member formed of a synthetic resin has a reduced weight, and can be economically manufactured by injection molding, for thereby reducing the weight and cost of manufacture of the piston. The synthetic resin preferably contains a glass fiber as a reinforcing material. The body portion formed of the aluminum alloy, and the closure member formed of the synthetic resin are fixed together by caulking the cylindrical body portion against the closure member, or by bonding the body portion and the closure member together. The body portion and the closure member can be firmly fixed together by employing these methods in combination.

(4) A piston according to the above mode (3), the hollow cylindrical body portion includes, on the side of the open end, an axial end portion which has an outside diameter smaller than that of the other portion of the body portion, the axial end portion being expanded radially outwardly by radial thermal expansion of the closure member formed of the synthetic resin at an operating temperature of the piston, so that the outside diameter of the axial end portion of the hollow cylindrical body portion is made equal to that of the other portion of the hollow cylindrical body portion during operation of the piston.

(5) A piston according to the above mode (2), the closure member is formed of an aluminum alloy which contains less than 5 wt. % of silicon.

Since an aluminum alloy containing less than 5 wt. % of silicon is suitable for manufacture by a forging operation, the closure member can be easily produced by forging. In the present arrangement wherein the hollow cylindrical body portion and the closure member are formed of the respective aluminum alloys whose silicon contents are different from each other, the body portion and the closure member can be firmly fixed together by press-fitting the closure member at its outer circumferential surface into the inner circumferential surface of the hollow cylindrical body portion, or by welding the body portion and the closure member together. A suitable adhesive agent may be used in combination with the above methods for fixing the body member and the closure member together.

(6) A piston according to the above mode (2), the closure member is formed of a material which contains magnesium as a major component.

The material whose major component is magnesium has a low specific gravity, so that the weight of the closure member can be easily reduced, resulting in reduction of the weight of the piston. In the present arrangement wherein the hollow cylindrical body portion and the closure member are formed of the respective different metallic materials, the body portion and the closure member can be firmly fixed together by press-fitting the closure member at its outer circumferential surface into the inner circumferential surface of the body portion, or by welding the body portion and the closure member together. A suitable adhesive agent may be used in combination with the above methods for fixing the body portion and the closure member together.

(7) A piston according to any one of the above modes (2)-(6), the aluminum alloy contains less than 13 wt. % of silicon.

The aluminum alloy whose silicon content exceeds 13 wt. % contains silicon in the form of primary crystal, making it difficult to form the components of the piston by forging. On the other hand, the aluminum alloy whose silicon content is not larger than 13 wt. % contains silicon in the form of eutectic silicon, so that the engaging portion and the hollow cylindrical body portion can be formed integrally with each other by forging, resulting in a reduced cost of manufacture of the pistion.

(8) A piston for a swash plate type compressor having a swash plate, including a hollow cylindrical head portion and an engaging portion which engages a swash plate through a pair of shoes such that the shoes are held in contact with opposite surfaces of the swash plate at a radially outer portion of the swash plate, wherein the hollow cylindrical head portion includes a hollow cylindrical body portion which has an open end on the side of the engaging portion and a closed end on the side remote from the engaging portion, the hollow cylindrical body portion being formed of an aluminum alloy containing less 5 wt. % of silicon, the hollow cylindrical head portion having a closure member which closes the open end of the hollow cylindrical body portion, the closure member being formed, integrally with the engaging portion, of an aluminum alloy containing silicon in an amount of 6~13 wt. %.

The aluminum alloy containing not smaller than 5 wt. % of silicon exhibits an excellent wear resistance, so that the piston exhibits a required durability at its engaging portion. In other words, the engaging portion of the piston has excellent durability at part-spherical inner surfaces of recesses formed therein for slidably receiving the pair of shoes. The aluminum alloy whose silicon content is not larger than 13 wt. % is more suitable for manufacture by a forging operation than an aluminum alloy whose silicon content exceeds 13 wt. %, so that the closure member and the engaging portion can be formed integrally with each other by forging. The aluminum alloy whose silicon content is less than 5 wt. % is particularly suitably used for manufacture by forging. Accordingly, the hollow cylindrical body portion which requires a large amount of stock removal from a blank in the form of the aluminum alloy can be manufactured by forging, permitting an economical manufacture of the piston having a reduced weight and improved durability. If the silicon content in the aluminum alloy is less than 3 wt. % or less than 1 wt. %, the body portion can be further easily manufactured by forging. Since the closure member which is formed integrally with the engaging portion, and the hollow cylindrical body portion are both formed of the aluminum alloys having respective different silicon contents, the body portion and the closure member can be easily welded together. The body portion and the closure member may be fixed together by press-fitting the closure member at its outer circumferential surface into the inner circumferential surface of the body portion. Further, a suitable adhesive agent may be used in combination with the above methods for fixing the body portion and the closure member together.

(9) A piston for a swash plate type compressor having a swash plate, including a hollow cylindrical head portion and an engaging portion which engages a swash plate through a pair of shoes such that the shoes are held in contact with opposite surfaces of the swash plate at a radially outer portion of the swash plate, wherein the hollow cylindrical head portion includes a hollow cylindrical body portion which has an open end on the side of the engaging portion and a closed end on the side remote from the engaging portion, the hollow cylindrical body portion being formed of a material containing magnesium as a major component, the hollow cylindrical head portion having a closure member which closes the open end of the hollow cylindrical body portion and which is formed, integrally with the engaging portion, of an aluminum alloy containing silicon in an amount of 5~13 wt. %.

In the piston according to the present arrangement, the closure member can be formed integrally with the engaging portion by forging, as in the piston according to the above mode (8). Although the body portion formed of the material whose major component is magnesium is not wear-resistant, the body portion has a reduced weight, and is welded to the closure member formed of the aluminum alloy. Alternatively, the body member and the closure member can be fixed together by press-fitting the closure member at its outer circumferential surface into the inner circumferential surface of the body portion. Further, a suitable adhesive agent may be used for fixing the body portion and the closure member together.

(10) A piston for a swash plate type compressor having a swash plate, including a hollow cylindrical head portion and an engaging portion which engages a swash plate through a pair of shoes such that the shoes are held in contact with opposite surfaces of the swash plate at a radially outer portion of the swash plate, wherein the hollow cylindrical head portion includes a hollow cylindrical body portion which has an open end on the side of the engaging portion and a closed end on the side remote from the engaging portion, the hollow cylindrical body portion being formed of a synthetic resin, the hollow cylindrical head portion having a closure member which closes the open end of the hollow cylindrical body portion and which is formed, integrally with the engaging portion, of an aluminum alloy containing silicon in an amount of 5~13 wt. %, for thereby providing the hollow cylindrical head portion of the piston.

If the synthetic resin is used for forming the hollow cylindrical body portion, the body portion has a reduced weight and can be economically manufactured by injection molding, resulting in reduction of the weight and cost of manufacture of the piston. The synthetic resin preferably contains a glass fiber as a reinforcing material.

BRIEF DESCRIPTION OF THE DRAWINGS

The above and optional objects, features, advantages and technical and industrial significance of the present invention will be better understood and appreciated by reading the following detailed description of a presently preferred embodiments of the invention, when considered in connection with the accompanying drawings, in which.

DETAILED DESCRIPTION OF THE PREFERRED EMBODIMENTS

Referring to the accompanying drawings, there will be described presently preferred embodiments of the present invention as applied to a single-headed piston for a swash plate type compressor used for an air conditioning system of an automotive vehicle.

Figure 1:
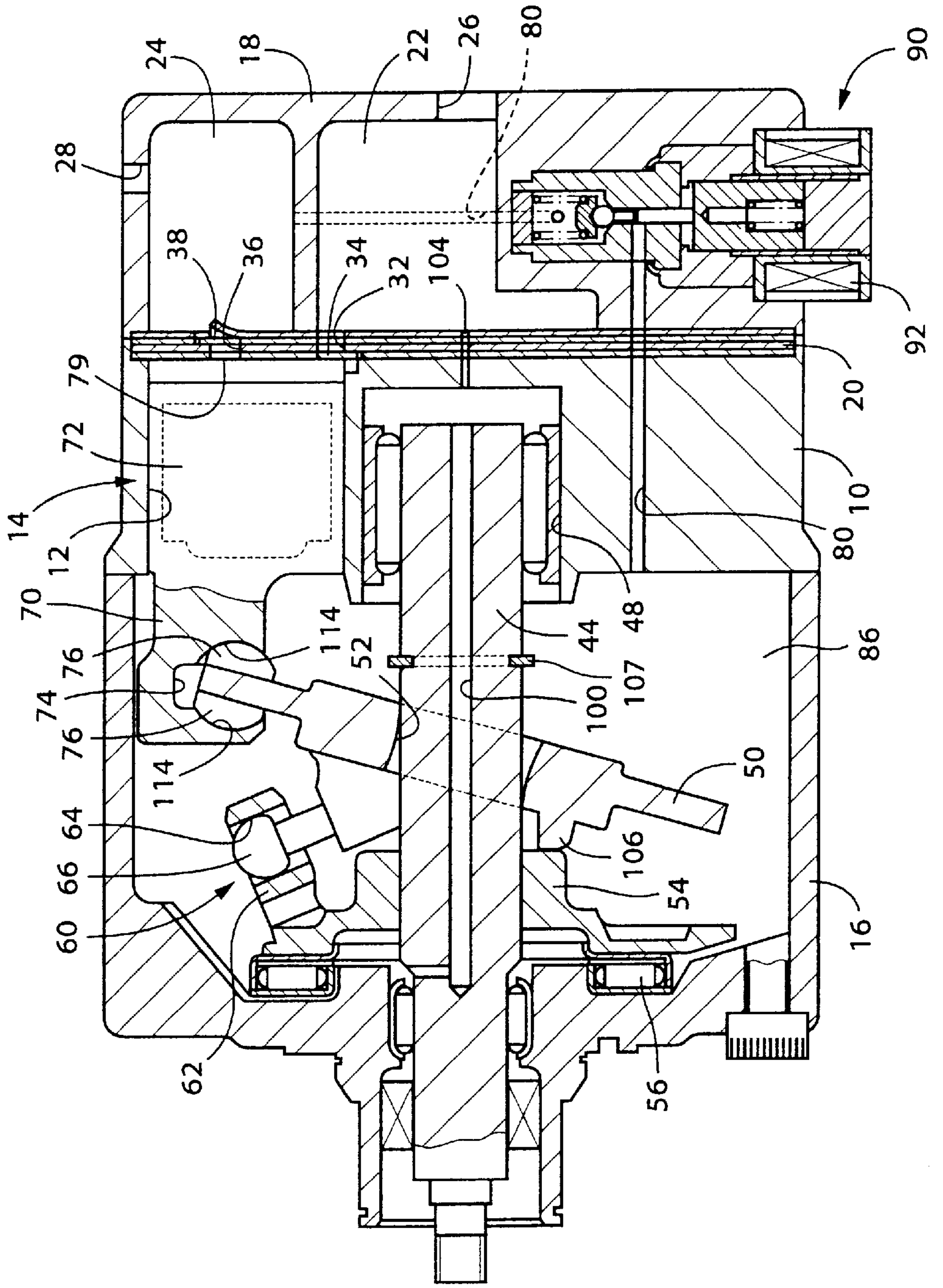
FIG. 1 is a front elevational view in cross section of a swash plate type compressor equipped with a piston constructed according to one embodiment of the present invention.

Referring first to FIG. 1, there is shown a compressor of swash plate type incorporating a plurality of single-headed pistons (hereinafter referred to simply as "pistons") each constructed according to one embodiment of the present invention.

In FIG. 1, reference numeral 10 denotes a cylinder block having a plurality of cylinder bores 12 formed so as to extend in its axial direction such that the cylinder bores 12 are arranged along a circle whose center lies on a centerline of the cylinder block 10. The piston generally indicated at 14 is reciprocably received in each of the cylinder bores 12. To one of the axially opposite end faces of the cylinder block 10, (the left end face as seen in FIG. 1, which will be referred to as "front end face"), there is attached a front housing 16. To the other end face (the right end face as seen in FIG. 1, which will be referred to as "rear end face"), there is attached a rear housing 18 through a valve plate 20. The front housing 16, rear housing 18 and cylinder block 10 cooperate to constitute a housing assembly of the swash plate type compressor. The rear housing 18 and the valve plate 20 cooperate to define a suction chamber 22 and a discharge chamber 24, which are connected to a refrigerating circuit (not shown) through an inlet 26 and an outlet 28, respectively. The valve plate 20 has suction ports 32, suction valves 34, discharge ports 36 and discharge valves 38.

A rotary drive shaft 44 is disposed in the cylinder block 10 and the front housing 16 such that the axis of rotation of the drive shaft 44 is aligned with the centerline of the cylinder block 10. The drive shaft 44 is supported at its opposite end portions by the front housing 16 and the cylinder block 10, respectively, via respective bearings. The cylinder block 10 has a central bearing hole 48 formed in a central portion thereof, and the bearing is disposed in this central bearing hole 48, for supporting the drive shaft 44 at its rear end portion. The front end portion of the drive shaft 44 is connected, through a clutch mechanism such as an electromagnetic clutch, to an external drive source (not shown) in the form of an engine of an automotive vehicle. In operation of the compressor, the drive shaft 44 is connected through the clutch mechanism to the vehicle engine in operation so that the drive shaft 44 is rotated about its axis.

The rotary drive shaft 44 carries a swash plate 50 such that the swash plate 50 is axially movable and tiltable relative to the drive shaft 44. The swash plate 50 has a central hole 52 through which the drive shaft 44 extends. The diameter of the central hole 52 of the swash plate 50 gradually increases in the axially opposite directions from its axially intermediate portion towards the axially opposite ends. To the drive shaft 44, there is fixed a rotary member 54 as a torque transmitting member, which is held in engagement with the front housing 16 through a thrust bearing 56. The swash plate 50 is rotated with the drive shaft 44 by a hinge mechanism 60 during rotation of the drive shaft 44. The hinge mechanism 60 guides the swash plate 50 for its axial and tilting motions. The hinge mechanism 60 includes a pair of support arms 62 fixed to the rotary member 54, guide pins 66 which are formed on the swash plate 50 and which slidably engage guide holes 64 formed in the support arms 62, the central hole 52 of the swash plate 50, and the outer circumferential surface of the drive shaft 44. It is noted that the swash plate 50 constitutes a drive member for driving the pistons 14, while the rotary drive shaft 44, the drive source in the form of the vehicle engine and the torque transmitting device in the form of the hinge mechanism 60 cooperate with each other to constitute a major portion of a drive device for driving the drive member.

The piston 14 indicated above includes an engaging portion 70 engaging the swash plate 50, and a head portion 72 formed integrally with the engaging portion 70 and fitted in the corresponding cylinder bore 12. The engaging portion 70 has a groove 74 formed therein, and the swash plate 50 is held in engagement with the groove 74 through a pair of hemi-spherical shoes 76. The hemi-spherical shoes 76 are held in the groove 74 such that the shoes 76 slidably engage the engaging portion 70 at their hemi-spherical surfaces and such that the shoes 76 slidably engage the radially outer portions of the opposite surfaces of the swash plate 50 at their flat surfaces. The configuration of the piston 14 will be described in detail.

A rotary motion of the swash plate 50 is converted into a reciprocating linear motion of the piston 14 through the shoes 76. A refrigerant gas in the suction chamber 22 is sucked into the pressurizing chamber 79 through the suction port 32 and the suction valve 34, when the piston 14 is moved from its upper dead point to its lower dead point, that is, when the piston 14 is in the suction stroke. The refrigerant gas in the pressurizing chamber 79 is pressurized by the piston 14 when the piston 14 is moved from its lower dead point to its upper dead point, that is, when the piston 14 is in the compression stroke. The pressurized refrigerant gas is discharged into the discharge chamber 24 through the discharge port 36 and the discharge valve 38. A reaction force acts on the piston 14 in the axial direction as a result of compression of the refrigerant gas in the pressurizing chamber 79. This compression reaction force is received by the front housing 16 through the piston 14, swash plate 50, rotary member 54 and thrust bearing 56.

The cylinder block 10 has a supply passage 80 formed therethrough for communication between the discharge chamber 24 and a crank chamber 86 which is defined between the front housing 16 and the cylinder block 10. The supply passage 80 is connected to a capacity control valve 90 provided to control the pressure in the crank chamber 86. The capacity control valve 90 is a solenoid-operated valve having a solenoid coil 92 which is selectively energized and de-energized by a control device (not shown) constituted principally by a computer. During energization of the solenoid coil 92, the amount of electric current applied to the solenoid coil 92 is controlled depending upon the air conditioner load, so that the amount of opening of the capacity control valve 90 is controlled according to the air conditioner load.

The rotary drive shaft 44 has a bleeding passage 100 formed therethrough. The bleeding passage 100 is open at one of its opposite ends to the central bearing hole 48, and is open to the crank chamber 86 at the other end. The central bearing hole 48 communicates at its bottom with the suction chamber 22 through a communication port 104.

The present swash plate type compressor is a variable capacity type. By controlling the pressure in the crank chamber 86 by utilizing a difference between the pressure in the discharge chamber 24 as a high-pressure source and the pressure in the suction chamber 22 as a low pressure source, a difference between the pressure in the crank chamber 86 which acts on the front side of the piston 14 and the pressure in the pressurizing chamber 79 is regulated to change the angle of inclination of the swash plate 50 with respect to a plane perpendicular to the axis of rotation of the drive shaft 44, for thereby changing the reciprocating stroke (suction and compression strokes) of the piston 14, whereby the discharge capacity of the compressor can be adjusted.

Described in detail, the pressure in the crank chamber 86 is controlled by controlling the capacity control valve 90 to selectively connect and disconnect the crank chamber 86 to and from the discharge chamber 24. Described more specifically, while the solenoid coil 92 is in the de-energized state, the capacity control valve 90 is held in its fully open state, and the supply passage 80 is opened for permitting the pressurized refrigerant gas to be delivered from the discharge chamber 24 into the crank chamber 86, resulting in an increase in the pressure in the crank chamber 86, and the angle of inclination of the swash plate 50 is minimized. The reciprocating stroke of the piston 14 which is reciprocated by rotation of the swash plate 50 decreases with a decrease of the angle of inclination of the swash plate 50, so as to reduce an amount of change of the volume of the pressurizing chamber 79, whereby the discharge capacity of the compressor is minimized. While the solenoid coil 92 is in the energized state, the amount of the pressurized refrigerant gas in the discharge chamber 24 to be delivered into the crank chamber 86 is reduced, by increasing an amount of electric current applied to the solenoid coil 92 to reduce (or zero) the amount of opening of the capacity control valve 90. In this condition, the refrigerant gas in the crank chamber 86 flows into the suction chamber 22 through the bleeding passage 100 and the communication port 104, so that the pressure in the crank chamber 86 is lowered, to thereby increase the angle of inclination of the swash plate 50. Accordingly, the amount of change of the volume of the pressurizing chamber 79 is increased, whereby the discharge capacity of the compressor is increased. When the intake passage 80 is closed upon energization of the solenoid coil 92, the pressurized refrigerant gas in the discharge chamber 24 is not delivered into the crank chamber 86, whereby the angle of inclination of the swash plate 50 is maximized to maximize the discharge capacity of the compressor.

The maximum angle of inclination of the swash plate 50 is limited by abutting contact of a stop 106 formed on the swash plate 50, with the rotary member 54, while the minimum angle of inclination of the swash plate 50 is limited by abutting contact of the swash plate 50 with a stop 107 in the form of a ring fixedly fitted on the drive shaft 44. In the present embodiment, the supply passage 80, the crank chamber 86, the capacity control valve 90, the bleeding passage 100, the communication port 104, and the control device for controlling the capacity control valve 90 cooperate to constitute a major portion of a crank chamber pressure control device for controlling the pressure in the crank chamber 86, or an angle adjusting device for controlling the angle of inclination of the swash plate 50 depending upon the pressure in the crank chamber 86 (a discharge capacity adjusting device for adjusting the discharge capacity of the compressor).

There will next be described the configuration of the piston 14.

Figure 2:
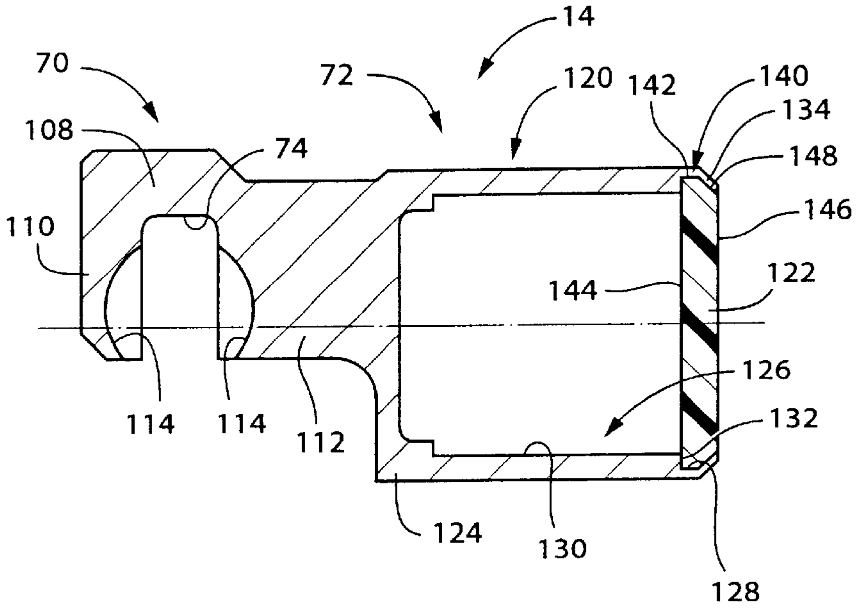
FIG. 2 is a front elevational view partly in cross section of the piston shown in FIG. 1.

The end portion of the engaging portion 70 of the piston 14, which is remote from the head portion 72, has a U-shape in cross section, as shown in FIG. 2. Described in detail, the engaging portion 70 has a base section 108 which defines the bottom of the U-shape, and a pair of substantially parallel arm sections 110, 112 which extend from the base section 108 in a direction perpendicular to the axis of the piston 14. The two opposed lateral walls of the U-shape of the engaging portion 70 have respective recesses 114 which are opposed to each other. Each of these recesses 114 is defined by a part-spherical inner surface of the lateral wall. The pair of shoes 76 indicated above are held in contact with the opposite surfaces of the swash plate 50 at its radially outer portion and are received in the respective part-spherical recesses 114. Thus, the engaging portion 70 slidably engages the swash plate 50 through the shoes 76.

The head portion 72 of the piston 14 is formed integrally with the engaging portion 70 on the side of its arm section 112, and includes a cylindrical body portion 120 which is open at one of its opposite ends on the side remote from the arm section 112 of the engaging portion 70, and an end section in the form of a closure member 122 fixed to the body portion 120 for closing the open end of the body portion 120. The engaging portion 70 and the head portion 72 are formed integrally with each other. Namely, the arm section 112 of the engaging portion 70 and a bottom portion 124 of the body portion 120 of the head portion 72 are integral with each other. The base section 108 of the engaging portion 70 extends in a direction parallel to the centerline of the body portion 120 from a radially outer portion of the bottom portion 124 of the body portion 120, which radially outer portion is spaced a suitable distance from the centerline and corresponds to a radially outer portion of the cylinder block 10 when the piston 14 is fitted in the appropriate cylinder bore 12. The body portion 120 has an inner circumferential surface 126 which is divided into two portions, i.e., a large-diameter portion 128 on the side of its open end and a small-diameter portion 130 remote from the open end, which two portions cooperate with each other to define a shoulder 132 therebetween. Accordingly, the body portion 120 has a smaller cylindrical wall thickness at its open end portion 134 at which the large-diameter portion 128 is formed, than the other portion of the body portion 120. The body portion 120 of the head portion 72 and the engaging portion 70 are integrally formed by die-casting of an aluminum alloy containing silicon. The content of the silicon included in the aluminum alloy for forming the body portion 120 of the head portion 72 and the engaging portion 70 is within a range of 5~13 wt. %. For instance, an aluminum alloy according to JIS (Japanese Industrial Standards) A4032 is preferably used.

The closure member 122 is a generally disc-shaped member and has an outer circumferential surface 140 which consists of a straight portion 142 having a diameter which permits the straight portion to be fitted in the large-diameter portion 128 of the body portion 120, and a tapered portion 148 extending from one of opposite ends of the straight portion 142 which is remote from an inner end face 144 of the closure member 122 and having a diameter which gradually decreases in an axial (longitudinal) direction of the closure member 122 from the inner end face 144 toward an outer end face 146 of the closure member 122. The closure member 122 of the present embodiment is formed of a thermoplastic synthetic resin material. The thermoplastic resin material is preferably a phenol resin, and contains a glass fiber as a reinforcing material. The closure member 122 is formed by injection molding.

In the present embodiment, the closure member 122 and the body member 120 are fixed together by bonding and caulkng. Namely, after an adhesive agent (not shown) has been applied to at least one of the shoulder 132 of the body portion 120 and the outer peripheral portion of the inner end face 144 of the closure member 122, the closure member 122 is fixed to the body portion 120 such that the straight portion 142 of the outer circumferential surface 140 of the closure member 122 engages the large-diameter portion 128 of the inner circumferential surface 126 of the body portion 120, and such that the inner end face 144 of the closure member 122 is held in abutting contact with the shoulder 132 of the body portion 120. The adhesive agent interposed between the inner end face 144 of the closure member 122 and the shoulder 132 of the body portion 120 is cured so that the inner end face 144 and the shoulder 132 are bonded to each other. Subsequently, the open end portion 134 of the body portion 120 is caulked radially inwardly against the tapered portion 148 of the outer circumferential surface 140 of the closure member 122, whereby the body portion 120 and the closure member 122 are fixed together. The compression reaction force which acts on the end face 146 of the piston 14, which end face partially defines the pressurizing chamber 79, as a result of compression of the refrigerant gas in the pressurizing chamber 79 during the compression stroke of the piston 14, is received by the shoulder 132 of the closure member 122 in abutting contact with the inner end face 144 of the body member 120, and the open end portion 134 of the body portion 120 caulked in pressing contact with the tapered portion 148 of the outer circumferential surface 140 of the closure member 122. While the body portion 120 and the closure member 122 are fixed together by bonding and caulking in the present embodiment, the body portion 120 and the closure member 122 may be fixed together by either bonding or caulking.

The piston 14 is coated at its outer circumferential surface with a suitable synthetic resin material such as fluoro resin, which exhibits excellent wear or abrasion resistance. As the fluoro resin, polytetrafluoroethylene is preferably used. The cylinder block 10 is formed of a metallic material in the form of an aluminum alloy. The body portion 120 of the head portion 72 of the piston 14 is formed of the above-described aluminum alloy. The fluoro resin coating of the piston 14 prevents a direct contact of the aluminum alloy of the piston 14 with the aluminum alloy of the cylinder block 10 so as to prevent seizure therebetween, and makes it possible to minimize the amount of clearance between the piston 14 and the cylinder bore 12. Other materials may be used for the cylinder block 10 and the coating film.

Figure 3:
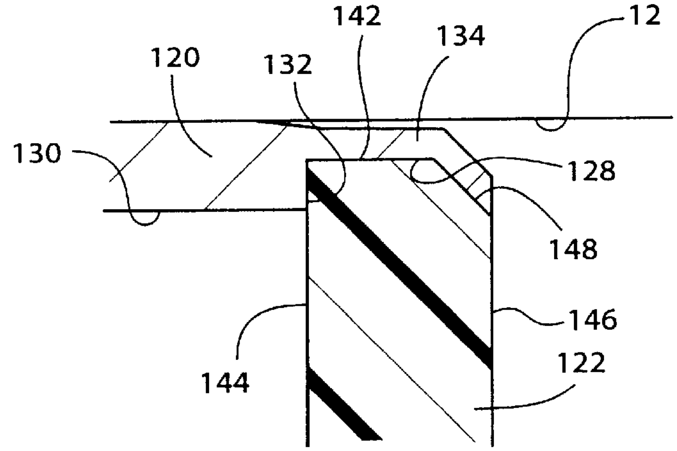
FIG. 3 is an enlarged front elevational view partly in cross section showing a portion of the piston of FIG. 2.

The piston 14 is then subjected to a machining operation on the coated outer circumferential surface of the body portion 120. The machining operation on the outer circumferential surface of the body portion 120 is effected such that a part of the axial end portion 134 of the body portion 120, which part is held in engagement with the straight portion 142 of the outer circumferential surface 140 of the closure member 122, has an outside diameter which is slightly smaller than the other portion of the body portion 120, as shown in FIG. 3. Since the closure member 122 is formed of the synthetic resin material whose thermal expansion coefficient is larger than that of the aluminum alloy of the head portion 120, the diameter of the above-indicated part of the axial end portion 134 of the body portion 120 is made smaller than the other portion, in view of the thermal expansion of the closure member 122 during the operation of the piston 14. According to this arrangement, the above-indicated part of the axial end portion 134 of the body portion 120 is pressed radially outwardly by the closure member 122 which is thermally expanded due to an elevated temperature during the operation of the piston 14, so that the outside diameter of the part of the axial end portion 134 contacting the straight portion 142 of the closure member 122 is made equal to that of the other portion of the body portion 120. The machining operation on the above-indicated part of the axial end portion 134 to reduce its diameter is effected by taking this fact into account. When the thermal expansion coefficients of the closure member 122 and the head portion 120 are made equal to each other by adjusting the content of the glass fiber included in the synthetic resin material of the closure member 122, it is not necessary to reduce the diameter of the above-indicated part of the axial end portion 134 of the body portion 120.

In the present embodiment, the engaging portion 70, which is required to have a high degree of wear resistance for slidably holding the pair of shoes 76, is formed of an aluminum alloy containing silicon in an amount of 5~13 wt. % for permitting the engaging portion 70 to exhibit excellent wear resistance, while the closure member 122 which is not required to have a high degree of wear resistance is formed of a relatively light and inexpensive synthetic resin material. Accordingly, the present arrangement permits economical manufacture of the piston 14 which has excellent wear resistance and a reduced weight.

Figure 4:
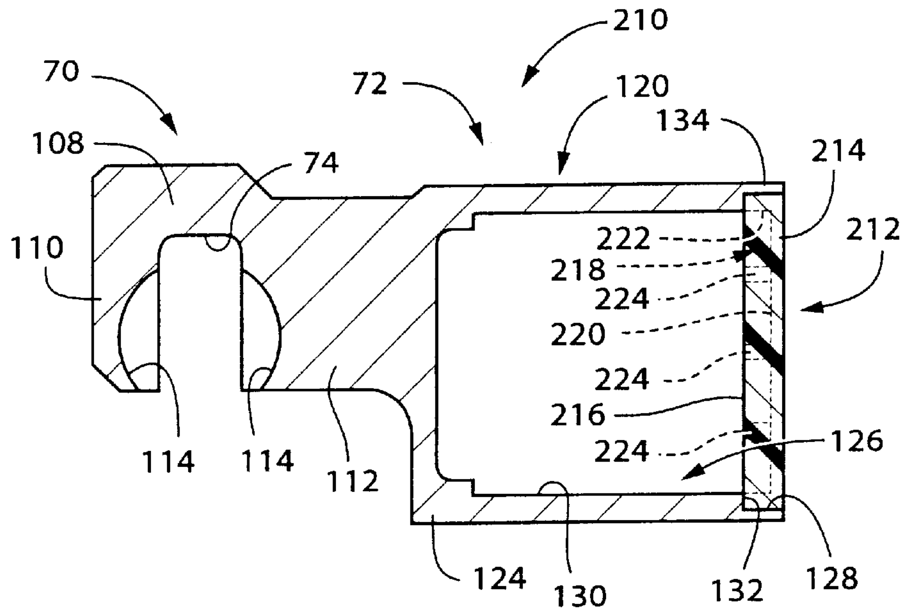
FIG. 4 is a front elevational view in cross section showing a piston constructed according to another embodiment of the present invention.
Figure 5:
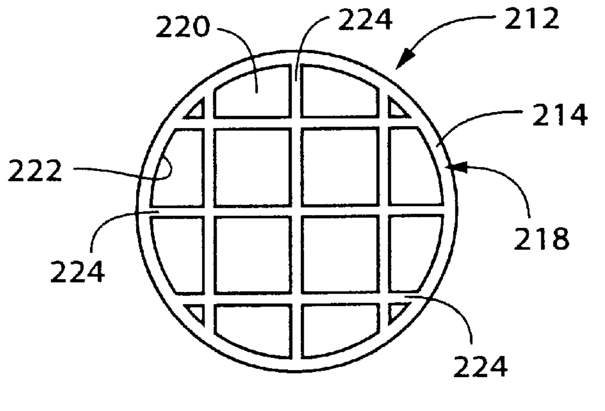
FIG. 5 is a left-hand side elevational view of a closure member of the piston of FIG. 4.

Referring next to FIGS. 4 and 5, there is shown a piston 210 constructed according to a second embodiment of the present invention. The piston 210 includes a closure member 212 which is different from that of the preceding first embodiment. The piston 210 of the present embodiment is also a single-headed piston used for the swash plate type compressor shown in FIG. 1. In FIGS. 4 and 5, the same reference numerals as used in the embodiment of FIGS. 1~3 are used to identify the corresponding components, and a detailed explanation of which is dispensed with. The piston 210 of the present embodiment includes an engaging portion 70 which engages the swash plate 50, and a head portion 72 which is slidably fitted in an appropriate cylinder bore 12. The head portion 72 of the piston 210 includes a hollow cylindrical body portion 120 which is open at one of its opposite ends on the side remote from the engaging portion 70, and a closure member 212 which closes the open end of the head portion 120. The closure member 212 includes a circular plate portion 214 having a recess 218 which is open in its inner end face 216. In the recess 218, there are provided a plurality of ribs 224 for the purpose of reinforcing the closure member 212, such that each rib 224 protrudes from a bottom surface 220 of the recess 218, and such that each rib 224 extends between appropriate two circumferential positions on an inner circumferential surface 222 of the recess 218. In the present embodiment, the plurality of ribs 224 are provided in the recess 218 in a grid or lattice pattern, as shown in FIG. 5. Like the closure member 122 of the preceding embodiment, the closure member 212 of the present embodiment is formed by injection molding of a thermoplastic resin material such as a phenol resin. The thermoplastic resin which provides the closure member 212 contains a glass fiber as a reinforcing material. The location and number of the ribs 224 as the reinforcing members for reinforcing the closure member 212 are not limited to those of the present embodiment.

In the present embodiment, the closure member 212 has an outside diameter which permits engagement of the closure member 212 with the large-diameter portion 128 of the body portion 120. The closure member 212 is fitted into the body portion 120 such that the outer peripheral portion of the inner end face 216 of the closure member 212 is held in abutting contact with the shoulder 132 of the body portion 120. The closure member 212 is fixed to the body portion 120 by an adhesive agent which is applied to at least one of the inner end face 216 of the closure member 212 and the shoulder 132 of the body portion 120. In the present embodiment, the closure member 212 has a reduced weight owing to the recess 218 formed in its inner end face 216, and exhibits an improved strength owing to the ribs 224 formed in the recess 218 described above. Accordingly, the weight of the piston 210 of the present embodiment can be reduced while permitting the piston 210 to exhibit a required strength at its end face which partially defines the pressurizing chamber 79. Further, the closure member 212 can be economically manufactured by injection molding of the synthetic resin material. The body portion 120 and the closure member 212 may be fixed together by caulking the axial end portion 134 of the body portion 120, in addition to, or in place of, the bonding of the inner end face 216 and the shoulder 132. In this case, the closure member 212 preferably has, at its outer circumferential surface, a tapered portion similar to the tapered portion 148 of the closure member 122 of FIG. 2. The axial end portion 134 of the body portion 120 is caulked radially inwardly so as to be held in pressing contact with the tapered portion of the closure member 212. Since the closure member 212 of the present embodiment is formed of the synthetic resin material described above, it is desirable to effect a machining operation on the outer circumferential surface of the body portion 120 to reduce an outside diameter of a part of the axial end portion 134 of the body portion 120, in view of the thermal expansion of the closure member 212 during operation of the piston 210.

Figure 6:
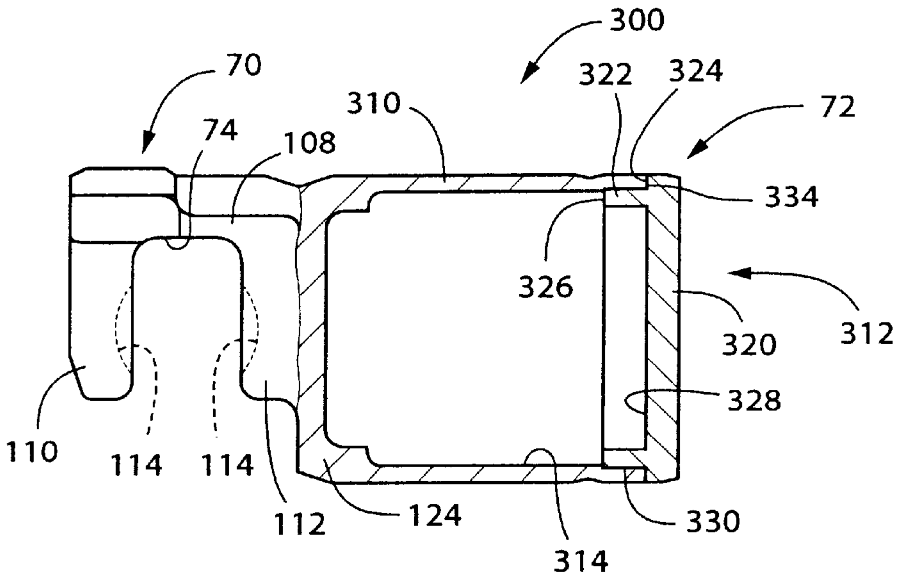
FIG. 6 is a front elevational view partly in cross section showing a piston constructed according to yet another embodiment of the present invention.

The closure member 212 may be formed of a material other than the synthetic resin. FIG. 6 shows a piston generally indicated at 300 constructed according to a third embodiment of the present invention. The piston 300 includes a closure member 312 formed of an aluminum alloy, which will be described. Like the pistons of FIGS. 2 and 4, the piston 300 of the present embodiment is a single-headed piston used for the swash plate type compressor of FIG. 1. In FIG. 6, the same reference numerals as used in the embodiment of FIGS. 1~3 are used to identify the corresponding components, and no redundant description of these components will be provided. As shown in FIG. 6, the piston 300 includes an engaging portion 70 which engages the swash plate 50, and a head portion 72 which is slidably fitted in the cylinder bore 12. The head portion 72 includes a hollow cylindrical body portion 310 which is open at one of its opposite ends on the side remote from the engaging portion 70, and a closure member 312 which closes the open end of the body portion 310. Like the body portion 120 and the engaging portion 70 of the pistons 14, 210, the body portion 310 and the engaging portion 70 of the piston 300 are formed of an aluminum alloy containing silicon in an amount of 5~13 wt. %. The body portion 310 is formed integrally with the engaging portion 70 by die-casting. It is preferable to use an aluminum alloy as specified according to JIS A4032. The closure member 312 is formed by die-casting of an aluminum alloy containing silicon in an amount of less than 5 wt. %, such as that specified according to JIS A2014, or A6061. The closure member 312 is formed separately from the integral member of the body portion 310 and the engaging portion 70.

The body portion 310 has an inner circumferential surface 314 whose diameter is constant over a substantially entire axial length of the body portion 310. The closure member 312 is a generally disc-shaped member which consists of a circular plate portion 320, and an annular fitting protrusion 322 which protrudes from one of the opposite end faces (the inner end face) of the circular plate portion 320 and which has a diameter smaller than that of the plate portion 320. A shoulder 324 is formed between the circular plate portion 320 and the annular fitting protrusion 322. The closure member 312 has a circular recess 328 which defines the annular fitting protrusion 322 and is open in an inner end face 326 of the fitting protrusion 322, so that the weight of the closure member 312 is reduced. The outer circumferential surface of the circular plate portion 320 has a diameter substantially equal to that of the outer circumferential surface of the body portion 310. The annular fitting protrusion 322 of the closure member 312 has an outer circumferential surface 330 whose diameter is slightly larger than the diameter of the inner circumferential surface 314 of the body portion 310, so that there exists an interference or a negative clearance between the outer circumferential surface 330 of the fitting protrusion 322 and the inner circumferential surface 314 of the body portion 310. Namely, the closure member 312 is press-fitted at the outer circumferential surface 330 of the fitting protrusion 322 into the inner circumferential surface 314 of the body portion 310, for effecting an interference fit between the surfaces 330, 314, such that the shoulder 324 of the closure member 312 is held in abutting contact with an end face 334 of the body portion 310. A rotary movement of the closure member 312 relative to the body portion 310 and an axial movement of the closure member 312 away from the body portion 310 are prevented by the interference fit between the outer circumferential surface 330 of the annular fitting protrusion 322 of the closure member 312 and the inner circumferential surface 314 of the body portion 310. The interference fit described above contributes to an improvement in the concentricity of the closure member 312 with respect to the body portion 310. The closure member 312 and the body portion 310 are fixed together by an adhesive agent applied between the shoulder 324 of the closure member 312 and the end face 334 of the body portion 310, which portions are held in abutting contact with each other. According to the present embodiment, the engaging portion 70 which is required to have a high degree of wear resistance is formed of a wear-resistant aluminum alloy while the closure member 312 which is not required to have a high degree of wear resistance is formed of an aluminum alloy whose silicon content is low, resulting in economical manufacture of the piston having a reduced weight and an improved durability. Since the body portion 310 and the closure member 312 are both formed of the respective aluminum alloys, the body portion 310 and the closure member 312 can be fixed together with high stability by press-fitting and bonding as described above.

The closure member 312 may be formed by forging, for example. In the present embodiment wherein the closure member 312 is formed of the aluminum alloy containing silicon in an amount of less than 5 wt. %, the closure member 312 can be easily formed by forging, resulting in a reduced cost of its manufacture. For permitting easy manufacture of the closure member 312 by forging, the amount of silicon in the aluminum alloy of the closure member 312 is preferably less than 3 wt. %, and more preferably less than 1 wt. %.

The closure member 312 may be formed of a magnesium alloy as specified according to JIS AZ91, for example. The closure member 312 formed of the magnesium alloy is effective to reduce the weight of the piston 300. The closure member 312 formed of the magnesium alloy may be produced by die-casting or forging. The body portion 120, 310 of the pistons 14, 210, 300 may be formed by forging.

The body portion 310 and the closure member 312 may be fixed together by either caulking or bonding. Alternatively, these members 310, 312 may be welded together. Further, the above-described methods may be employed in combination for fixing the body portion 310 and the closure member 312 together.

Each of the aluminum alloy having a silicon content of less than 5 wt. % and used for the closure member 312, and the magnesium alloy used for forming the closure member 312 has a thermal expansion coefficient slightly larger than that of the aluminum alloy having a silicon content of 5~13 wt. % and used for forming the body portion 310. The difference between the thermal expansion coefficients is, however, negligibly small, so that it is not necessary to reduce the outside diameter of the axial end portion of the body portion 310 to be held in engagement with the closure member 312 by a machining operation as effected for the piston 14 to compensate for the thermal expansion of the synthetic resin-made closure member 122.

Figure 7:
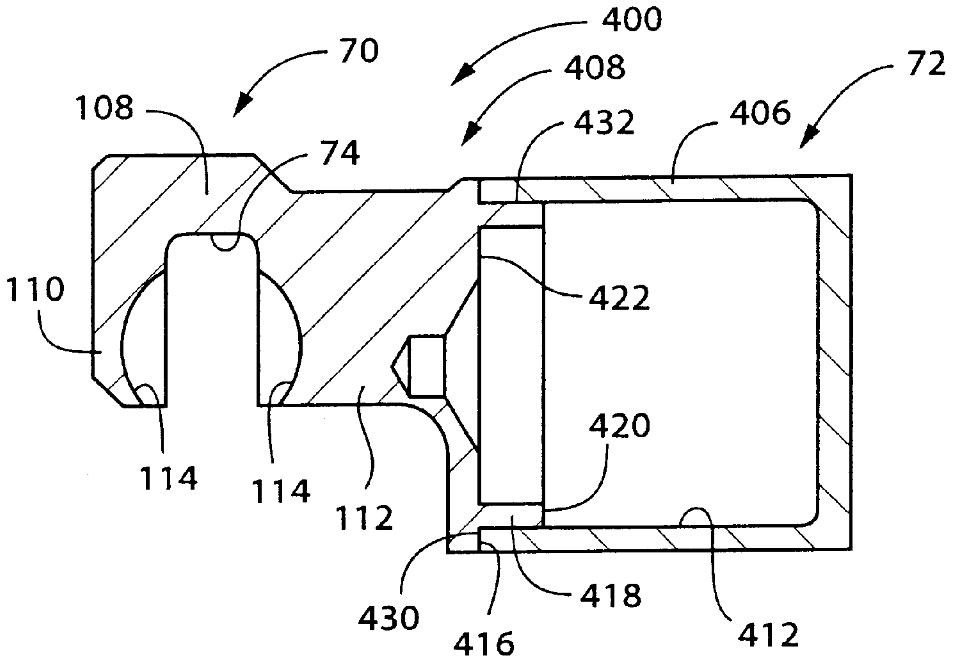
FIG. 7 is a front elevational view in cross section showing a piston constructed according to a further embodiment of the present invention.

The structure of the piston is not limited to those of the illustrated embodiments of FIGS. 1~3, 4~5 and 6. Referring to FIG. 7, there is shown a piston 400 constructed according to a fourth embodiment of the present invention. The piston 400 is a single-headed piston used for the swash plate type compressor sown in FIG. 1, and a detailed explanation of the compressor is dispensed with. In FIG. 7, the same reference numerals as used in the embodiment of FIGS. 1~3 are used to identify the corresponding components, and a detailed explanation of which is dispensed with.

The piston 400 of FIG. 7 includes an engaging portion 70 which engages the swash plate 50, and a head portion 72 which is slidably fitted in the cylinder bore 12. The head portion 72 of the piston 400 includes a hollow cylindrical body portion 406, and a closing portion 408 which closes an open end of the body portion 406. The closing portion 408 is formed integrally with the engaging portion 70 by forging of an aluminum alloy whose silicon content is in a range of 5~13 wt. %, such as an aluminum alloy as specified according to JIS A4032. The head portion 406 is formed separately from the integral member of the engaging portion 70 and the closing portion 408, by forging of an aluminum alloy whose silicon content is less than 5 wt. %, such as an aluminum alloy as specified according to JIS A2014, or A6061.

The body portion 406 of the piston 400 has an inner circumferential surface 412 having a constant diameter over a substantially entire axial length of the body portion 406. The closing portion 408 has an outside diameter which is substantially equal to that of the body portion 406, and includes an annular fitting protrusion 418 which protrudes from its end face 416 and which has a diameter smaller than that of the closing portion 408. The closing portion 408 has a circular recess 422 which defines the annular fitting protrusion 418 and which is open in an end face 420 of the fitting protrusion 418, so that the weight of the closing portion 408 is reduced. The closing portion 408 is fixed to the body portion 406 such that the end face 416 of the closing portion 408 is held in abutting contact with an end face 430 of the body portion 406, and such that an outer circumferential surface 432 of the fitting protrusion 418 engages the inner circumferential surface 412 of the body portion 406. The closing portion 408 and the body portion 406 are welded together by an electron beam welding at the end face 416 of the closing portion 408 and the end face 430 of the body portion 406 which are held in abutting contact with each other.

The outer circumferential surfaces of the body portion 406 and the closing portion 408 of the piston 400 are coated with a suitable wear-resistant synthetic. resin material such as a fluoro resin film. The cylinder block 10 is formed of a metallic material in the form of an aluminum alloy. The body portion 406 of the piston 400 is formed of the above-described aluminum alloy. The fluoro resin coating of the outer circumferential surface of the body portion 406 is effective to prevent a direct contact of the aluminum alloy of the body portion 406 with the aluminum alloy of the cylinder block 10 so as to prevent seizure therebetween, and makes it possible to minimize the amount of clearance between the piston 400 and the cylinder bore 12. Other materials may be used for the cylinder block 10 and the coating film.

According to the present embodiment, the engaging portion 70 which is required to have a high degree of wear resistance is formed of a wear-resistant aluminum alloy whose silicon content is in a range of 5~13 wt. % while the bottom wall of the body portion 406 (i.e., the end face of the piston 400) which partially defines the pressurizing chamber 79 and which need not have a high degree of wear resistance, and the cylindrical wall of the body portion 406 coated with the wear-resistant synthetic resin film are formed of a relatively inexpensive aluminum alloy whose silicon content is smaller than that of the aluminum alloy of the engaging portion 70. When the body portion 406 is formed by forging of an aluminum alloy whose silicon content is less than 5 wt. %, the body portion 406 can be easily and economically formed by forging, so that the piston 400 having a reduced weight and excellent durability can be produced at a relatively low cost. Since the body portion 406 and the closing portion 408 are both formed of the aluminum alloys having respective different silicon contents, the body portion 406 and the closing portion 408 are easily welded together.

The body portion 406 and the closing portion 408 may be fixed together by any suitable means other than welding. For instance, the closing portion 408 may be bonded to or press-fitted into the body portion 408. Further, these methods may be employed in combination.

For instance, the outer circumferential surface 432 of the fitting protrusion 418 of the closing portion 408 has a diameter slightly larger than the diameter of the inner circumferential surface 412 of the body portion 406. The fitting protrusion 418 is press-fitted at the outer circumferential surface 432 into the inner circumferential surface 412 of the body portion 406, with an interference fit therebetween. Further, the end face 416 of the closing portion 408 is bonded to the end face 430 of the body portion 406 by using an adhesive agent. The closing portion 408 and the body portion 406 are fixed together such that the closing portion 408 is bonded to and press-fitted into the body portion 406.

The silicon content of the aluminum alloy of the body portion 406 is preferably less than 3 wt. %, and more preferably less than 1 wt. %, in view of a fact that a lower content of silicon in the aluminum alloy permits easier forging of the body portion 406.

The integral member of the closing portion 406 and the engaging portion 70, and the body portion 406 may be formed by die-casting.

The body portion 406 of the piston 400 may be formed by forging or die-casting of a magnesium alloy as specified according to JIS AZ91, for instance. The body portion 406 formed of the magnesium alloy has a reduced weight.

Alternatively, the body portion 406 may be formed of a thermoplastic synthetic resin material such as a phenol resin. It is preferable that the thermoplastic resin contains a glass fiber as a reinforcing material. The body portion 406 formed of the synthetic resin is preferably formed by injection molding, and is fixed to the closing portion 408 by fusion or welding. According to this arrangement, the body portion 406 having a reduced weight can be produced at a relatively low cost.

The outer circumferential surface of the body portion 406 which is formed of the magnesium alloy or the synthetic resin is preferably coated with a wear-resistant synthetic resin film.

As the thermoplastic resin, an epoxy resin or a nylon resin may be used. As the reinforcing material contained in the thermoplastic resin, a carbon fiber, an alumina or a mixture thereof may be used as well as the glass fiber.

The body portion and the closing member or portion may be fixed together by means of screws, or by utilizing a flow of a plastic material between the two members. These methods may be used in combination with the methods (i.e., press-fitting and bonding) employed in the illustrated embodiments.

The construction of the swash plate type compressor for which the pistons 14, 210, 300, 400 according to the present invention are incorporated is not limited to that of FIG. 1. For instance, the capacity control valve 90 is not essential, and the compressor may use a shut-off valve which is mechanically opened and closed depending upon a difference between the pressures in the crank chamber 86 and the discharge chamber 24. In place of or in addition to the capacity control valve 90, a solenoid-operated control valve similar to the capacity control valve 90 may be provided in the bleeding passage. Alternatively, a shut-off valve may be provided, which is mechanically opened or closed depending upon a difference between the pressures in the crank chamber 86 and the suction chamber 22. The pistons in the illustrated embodiments may be used in a swash plate type compressor of fixed capacity type wherein the inclination angle of the swash plate is fixed. Further, the pistons may be double-headed.

While the presently preferred embodiment of this invention has been described above, for illustrative purpose only, it is to be understood that the present invention may be embodied with various changes and improvements such as those described in the SUMMARY OF THE INVENTION, which may occur to those skilled in the art.

What is claimed is:

1. A piston for a swash plate type compressor having a swash plate, comprising:

an engaging portion which engages said swash plate trough a pair of shoes such that said shoes are held in contact with opposite surfaces of said swash plate at a radially outer portion of said swash plate;

a hollow cylindrical head portion which includes a hollow cylndrical body portion having open ends at axially opposite ends thereof, and a first closing portion locate on the side of said engaging portion for closing one of said open ends on the side of said engaging portion, and a second closing portion located on the side remote from said engaging portion for closing the other open end on the side remote from said engaging portion;

said first closing portion located on the side of said engaging portion being formed, integrally with said engaging portion, of an aluminum alloy which contains silicon in an amount of 5 to 13 wt. %.

2. A piston according to claim 1, wherein said hollow cylindrical body portion is formed integrally wit said engaging portion and said first closing portion.

3. A piston according to claim 3, wherein said second closing portion is formed of a synthetic resin.

4. A piston according to claim 3, wherein said hollow cylindrical body portion includes, on the side of said open end, an axial end portion which has an outside diameter smaller than that of the other portion of said body portion, said axial end portion being expanded radially outwardly by radial thermal expansion of said second closing portion formed of said synthetic resin at an operating temperature of the piston, so that said outside diameter of said axial end portion of said hollow cylindrical body portion is made equal to that of the other portion of said hollow cylindrical body portion during operation of the piston.

5. A piston according to claim 1, wherein said second closing portion is formed of material which contains magnesium as a major component.

6. A piston for a swash plate type compressor having a swash plate, comprising:

an engaging portion which engages said swash plate through a pair of shoes such that said shores are held in contact with opposite surfaces of said swash plate at a radially outerportion of said swash plate;

a hollow cylindrical head portion including a hollow cylindrical bodyportion having an open end on the side remote from said engaging portion and a closed end on the side of said engaging portion;

said engaging portion and said hollow cylindrical body portion being formed, integrally with each other, of an allaninum alloy which contains not smaller than 5 wt. % of silicon; and said hollow cylindrical head portion having a closure member which closes said open end of said hollow cylindrical body portion and which is formed of an aluminum alloy which contains less that 5 wt. % silicon.

7. A piston for a swash plate type compressor having a swash plate, comprising:

an engagin, portion which engages said swash plate through a pair of shoes such that said shoes are held in contact with opposite surfaces of said smash plate at a radially outer portion of said swash plate;

a hollow cylindrical head portion including a hollow cylindrical body portion which has an open end on the side of said engaging portion and a closed end on the side remote from said engaging portion, said hollow cylindrical body portion being formed of an aluminum alloy containing less than 5 wt. % of silicon; and said hollow cylindrical head portion having a closure member which closes said open end of said hollow cylindrical body portion and which is formed, integrally with said engaging portion of an aluminum alloy containing silicon in an amount of 5 to 13 wt. %.

8. A piston for a swash plate type compressor having a swash plate, comprising;

an engaging portion which engages said swash plate through a pair of shoes such that said shoes are held in contact with opposite surfaces of said swash plate at a radially outer portion of said swash plate;

a hollow cylindrical head portion including a hollow cylindrical body portion which has an open end on the side of said engaging portion and a closed end on the side remote from said engaging portion, said hollow cylindrical body portion being formed of a material containing magnesium as a major component; and said hollow cylindrical head portion having a closure member which closes said open end of said hollow cylindrical body portion and which is formed, integrally with said engaging portion, of an aluminum alloy containing silicon in an amount of 5 to 13 wt. %.

9. A piston for a swash plate type compressor having a swash plate, comprising:

an engaging portion which engages said swash plate through a pair of shoes such that said shoes are held in contact with opposite surfaces of said swash plate at a radially outer portion of said swash plate;

a hollow cylindrical head portion including a hollow cylindrical body portion which has an open end on the side of said engaging portion and closed end on the side remote from said engaging portion, said hollow cylindrical body portion being formed of a synthetic resin; and said hollow cylindrical head portion having a closure member which closes said open end of said hollow cylindrical body portion and which is formed, integrally with said engaging portion, of an aluminum alloy containing silicon in an amount of 5 to 13 wt. %.

* * * * *

UNITED STATES PATENT AND TRADEMARK OFFICE

CERTIFICATE OF CORRECTION

PATENT NO. : 6,415,705 B1
DATED : July 9, 2002
INVENTOR(S) : Kato et al.

It is certified that error appears in the above-identified patent and that said Letters Patent is hereby corrected as shown below:

Column 1,
Line 45, after "member, so" delete "at" and insert therefor -- as -- (second occurrence).

Column 4,
Line 19, delete "6" and insert therefor -- 5 --.

Column 14,
Line 60, after "synthetic" delete -- . --.

Column 16,
Line 21, after "passage" insert therefor -- (100) --.
Line 40, delete "trough" and insert therefor -- through --.
Line 56, delete "wit" and insert therefor -- with --.
Line 58, delete "3" and insert therefor -- 1 --.

Column 17,
Line 5, after "of" insert -- a --.
Line 10, delete "shores" and insert therefor -- shoes --.
Line 12, delete "outerportion" and insert therefor -- outer portion --.
Line 14, delete "bodyportion" and insert therefor -- body portion --.
Line 31, delete "smash" and insert therefor -- swash --.

Column 18,
Line 2, after "portion" insert -- , --.
Line 30, after "and" insert -- a --.

Signed and Sealed this

Seventeenth Day of December, 2002

JAMES E. ROGAN
*Director of the United States Patent and Trademark Office*